F. O. JAQUES, Jr.
MICROMETER CALIPERS.
APPLICATION FILED NOV. 23, 1907.
902,493.
Patented Oct. 27, 1908.
2 SHEETS—SHEET 1.
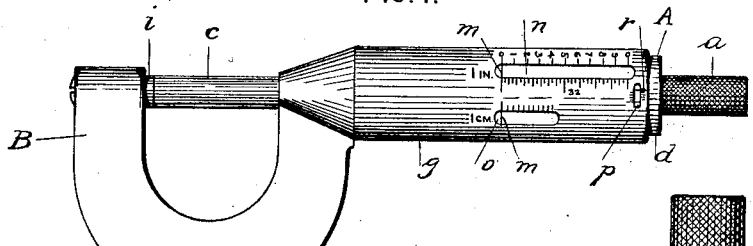
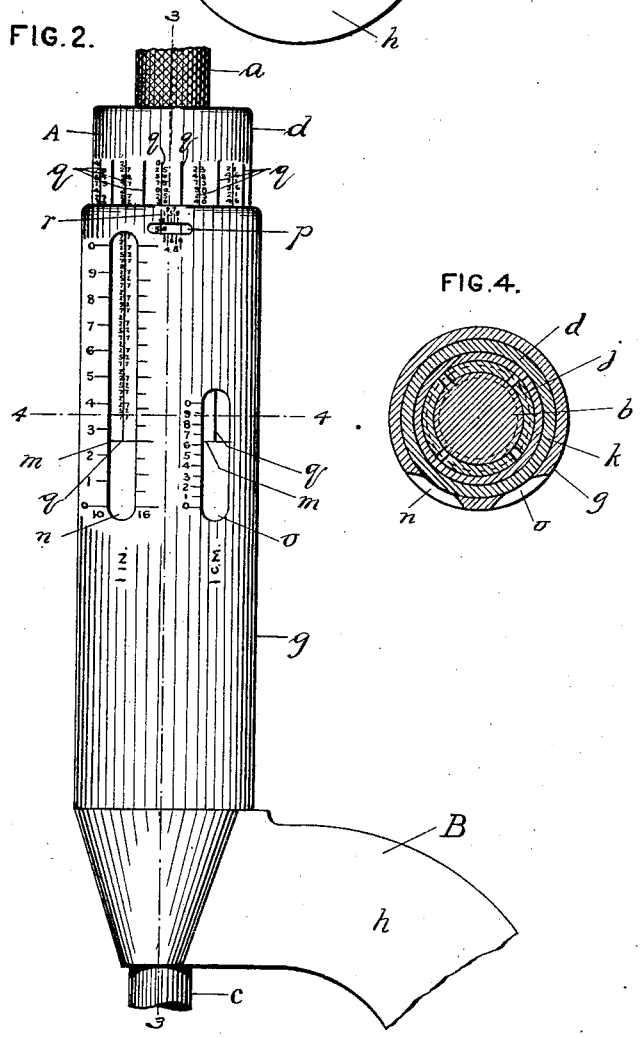
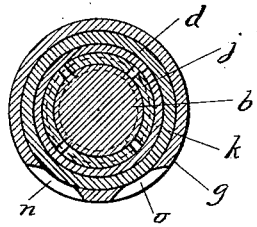
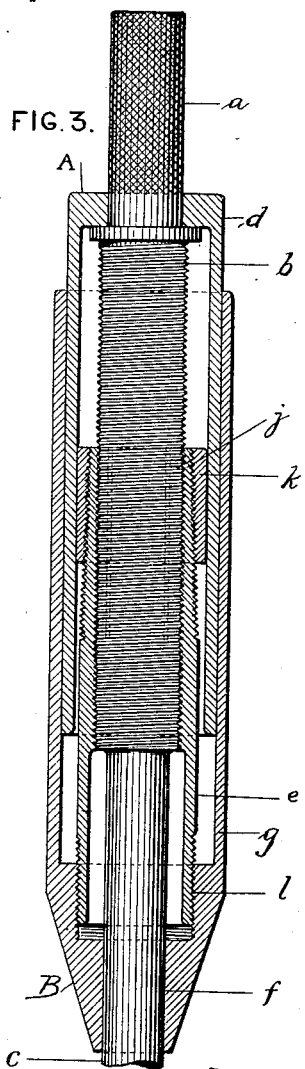
Witnesses
W. H. Bevans.
A. M. Spofford
Inventor
Fernando O. Jaques Jr.
By
Attorney F. O. JAQUES, Jr.
MICROMETER CALIPERS.
APPLICATION FILED NOV. 23, 1907.
902,493.
Patented Oct. 27, 1908.
2 SHEETS—SHEET 2.
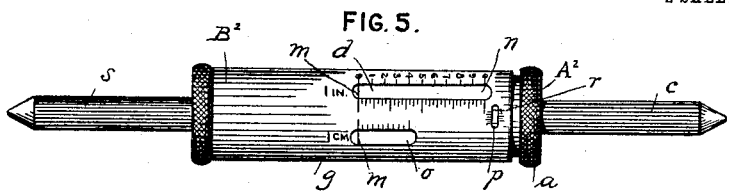
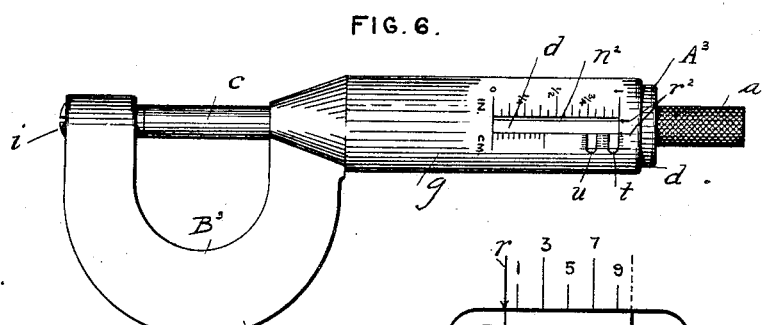
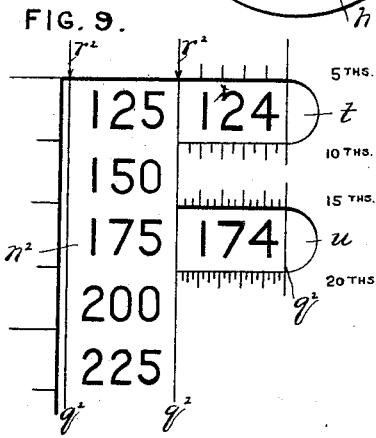
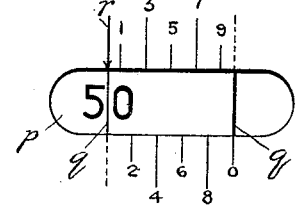
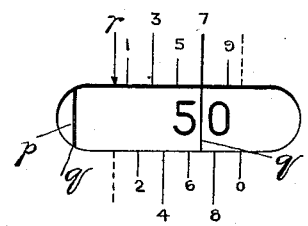
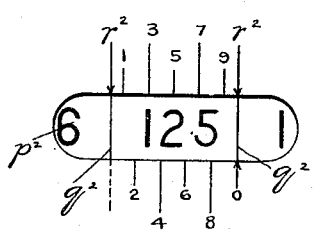
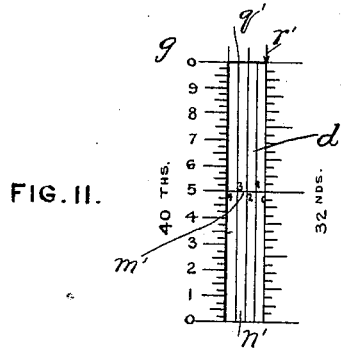
Witnesses
W. H. Bevans
A. M. Spofford
Inventor
Fernando O. Jaques Jr.
By
Attorney
THE NORRIS PETERS CO., WASHINGTON, D. C.

UNITED STATES PATENT OFFICE.

FERNANDO O. JAQUES, JR., OF PROVIDENCE, RHODE ISLAND, ASSIGNOR TO WINSOR & JERAULD MANUFACTURING COMPANY, OF PROVIDENCE, RHODE ISLAND, A CORPORATION OF MAINE.

MICROMETER-CALIPERS.

No. 902,493.

Specification of Letters Patent.

Patented Oct. 27, 1908.

Application filed November 23, 1907. Serial No. 403,446.

*To all whom it may concern:*

Be it known that I, FERNANDO O. JAQUES, Jr., a citizen of the United States of America, and a resident of Providence, in the State of Rhode Island, have invented a new and useful Improvement in Micrometer-Calipers, of which the following is a specification.

This invention relates to "micrometer calipers" and particularly to that familiar type in which each caliper is composed of two relatively movable members, one of which, herein termed the "spindle" member, includes the micrometer screw and a concentric sleeve movable therewith; the other, herein termed the "frame" member, including an internally screw-threaded part, interacting with the screw, and a concentric sleeve so connected with said part as to be immovable in the ordinary operation of the caliper.

As ordinarily constructed heretofore, the sleeve last named is internal and provided with a longitudinal scale, and the outer sleeve, being rotatable with the screw, is provided with a circumferential series of graduations supplemental to those of the longitudinal scale, and each measurement is determined by reading the two scales and calculating the total indicated by the graduations on the two sleeves; while, unless special locking means be added, the outer sleeve can not be touched in handling the tool or in laying it down without danger of accidentally turning the sleeve and thus changing the indicated measurement.

The leading object of the present invention is to construct a caliper of substantially the same popular form and equally simple, but with the inner sleeve movable and the outer sleeve immovable, which is adapted to indicate the micrometric measurements in plain figures, or by scales as simple as those of the ordinary foot rule and without the liability to mistakes incident to mental calculations; and in which the movable sleeve is protected against being accidentally turned, without locking it, and the outer sleeve by which the movable sleeve is so protected, is or may be adapted to be used as a handle by which to manipulate the tool; while the two sleeves interact with each other as heretofore to inclose the micrometer screw and the internally threaded part interacting therewith, and to protect the same against dirt and rust.

Another object of the invention is to provide for conveniently indicating measurements on one or more longitudinal scales on the exterior of the outer sleeve by means of a single circumferential index line on the periphery of the inner sleeve.

Another object is to facilitate providing such calipers with scales appropriate to different measurement standards, as the ordinary or English standard and the metric standard.

Another object is to provide for a preliminary endwise adjustment of the movable spindle member, as a whole, with reference to the frame member, so as to make the longitudinal scale or scales on the outer sleeve tally accurately with said circumferential index line on the inner sleeve.

Another object is to provide for indicating measurements in plain figures with as few numerals as practicable on the periphery of the inner sleeve, hereinafter termed the barrel, in order that the numeral-forming figures may be as large and distinct as possible.

Another object is to facilitate indicating in such calipers very minute measurements, such as one ten-thousandth of an inch, or one millionth of a meter (one micromillimeter).

The present invention consists in certain novel combinations of peculiarly constructed parts, hereinafter set forth and claimed, and in an improved micrometer caliper embodying them or any of them.

Two sheets of drawings accompany this specification as part thereof.

Figure 1 is an elevation of an improved micrometer caliper embodying one species of the present invention; Fig. 2 is an elevation of the sleeve portion of the same caliper drawn to a larger scale and adjusted to indicate one quarter of an inch, two hundred and fifty one-thousandths of an inch, or 6.35 millimeters; Fig. 3 represents a longitudinal section on the line 3—3, Fig. 2; Fig. 4 represents a transverse section on the line 4—4, Fig. 2; Fig. 5 is a side view of an "inside" micrometer caliper which is or may be of the same construction with reference to its sleeves and graduations as the outside caliper represented by Figs. 1-4; Fig. 6 is a like view of another outside caliper, having a single index opening with different graduations on the barrel and outer sleeve as compared with the first and second species; Figs. 7 and 8 represent enlargements illustrating the readings at the small index opening in Figs. 1, 2 and 5; Fig. 9 represents an enlargement of the outer end of the index opening shown in Fig. 6, and of the measurement indicating numerals on the barrel as they appear therethrough; Fig. 10 represents an outer sleeve provided with a different index opening and graduations employed in connection with a barrel having graduations and numerals as in Figs. 6 and 9; and Fig. 11 represents another modification of the inner and outer sleeves with reference to a more simple and inexpensive construction.

Like reference characters refer to like parts in all the figures.

In each of the species, the improved caliper, in common with previous forms of the same type hereinbefore referred to, is composed of two relatively movable members, A and B or $A^2$ and $B^2$ or $A^3$ and $B^3$, herein termed respectively the "spindle" member and the "frame" member; the spindle member A or $A^2$ or $A^3$ including the customary spindle head, $a$, the micrometer screw, $b$, the customary contacting spindle end, $c$, and a concentric barrel, $d$, movable as one part; while the frame member B or $B^2$ or $B^3$ includes an internally screw-threaded part, $e$, interacting with the screw $b$, a spindle guide, $f$, in ordinary or outside calipers, through which the spindle end $c$ protrudes, and a concentric sleeve, $g$, in all forms, so connected with said internally screw-threaded part and the remainder of the frame member as to be immovable in the ordinary operation of the caliper.

The sleeve $g$ last named, in all forms of the improved micrometer caliper, is the outer sleeve, and being immovable may be used as a handle in manipulating the tool without disturbing its delicate adjustment; it closely embraces the barrel $d$ and protects the same against such disturbance, and interacts with said barrel to protect the fine screw-thread of the screw $b$ and part $e$ against dirt and rust, and it is apertured with one or more openings through which measurement-indicating lines and numerals, either or both, on the periphery of the barrel $d$, hereinafter referred to in common as measurement-indicating means, may be conveniently and distinctly read in one and the same position of the caliper, whatever the measurement may be.

In the species represented by Figs. 1 to 4, inclusive, and Figs. 7 and 8, the frame member B is of a form that is nearly common in those outside or ordinary micrometer calipers heretofore in general use, including the customary anvil supporting yoke, $h$, which is preferably provided with a contacting anvil, $i$, in the form of a screw, to provide for adjusting the caliper when the opposing ends of the anvil and spindle, either or both, wear sufficiently to require such adjustment. The internally threaded part $e$ has the customary longitudinally-split nut end, $j$, and the customary tapering external screwthread and nut, $k$, for taking up wear in the micrometer thread of the screw $b$ and internally threaded part $e$. These adjustments are ordinary. Another adjustment is provided for by a screw joint, $l$, between said internally threaded part $e$ and the body of the frame member B, as shown in Fig. 3, which provides for adjusting longitudinally said internally threaded part $e$ and therewith the screw $b$ and the barrel $d$, bodily, to make a circumferential index line, $m$, Figs. 1 and 2, on the periphery of said barrel at midlength thereof, tally accurately with longitudinal scales on the outer sleeve $g$. This adjustment is made at the factory by turning the internally threaded part $e$ on its axis within the body of the frame member B to exactly the required extent in assembling the parts, which are so tightly fitted as to prevent accidental displacement. In said first species such longitudinal scales on the outer sleeve $g$ are respectively adapted to indicate, in connection with said index line $m$, tenths of an inch, the ordinary major divisions of an inch down to sixteenths and millimetric sub-divisions of a centimeter; which are conveniently arranged along the longitudinal edges of an inch opening, $n$, and a centimeter opening, $o$, in the outer sleeve.

The inner end of the barrel $d$ and the space for its reception within the outer sleeve $g$ are conveniently made long enough so that when the spindle end $c$ and the anvil $i$ are separated the full distance represented by the longer opening, $n$, in the outer sleeve $g$, and at all intermediate adjustments, as well as when the caliper is "closed" as in Fig. 1, all the openings in the outer sleeve will be shut against access to the screw $b$, and the internal screw-thread interacting therewith by the barrel $d$, which fits snugly within the outer sleeve $g$, and is free from openings.

A third opening, $p$, in the outer sleeve $g$, is so located and proportioned as to expose to view the numeral-forming figure or figures on the barrel $d$ which is or are at the reading or measurement indicating position, and a sufficient length of one or more of a series of longitudinal graduation lines common to the whole of this series of figures. Said longitudinal graduation lines are shown at $q$, and divide the periphery of the barrel $d$ circumferentially into equal parts, each of which in said first species corresponds with an endwise movement of one-thousandth of an inch. The screw $b$ having forty threads to the inch, there are twenty-five such lines on the periphery of the barrel $d$, which aline or register successively with a pointer, $r$, on the outer sleeve, located adjacent to the opening $p$ through which the measurement-indicating lines and figures on the barrel $d$ are exposed to view as in Figs. 1, 2, 7 and 8. Said openings $n$, $o$ and $p$ of the outer sleeve $g$ and the scales and pointers along their edges, or such of them as may suffice for a given function, and the mechanical equivalents of these features respectively, may be termed the measurement-indicating means of said outer sleeve $g$.

A continuous or practically continuous series of numeral-forming figures is arranged on the periphery of the barrel $d$ as shown in Fig. 2. Beginning at a point near the outer end of the barrel, located with reference to the index opening $p$ and the pointer $r$ on the outer sleeve $g$ at that opening, the series extends spirally around the barrel; the pitch of the spiral corresponding with that of the thread of the screw $b$. The length of the series is determined by the capacity of the caliper, and is consequently sufficient to indicate one inch, in one-thousandths of an inch, in said first species. Apart from the spiral arrangement the figures are arranged in longitudinal rows corresponding with the graduation lines $q$, or with alternate lines in the specific arrangement represented by Fig. 2 and by Figs. 7 and 8 and hereinafter more particularly described.

To provide for making the numeral-forming figures on the barrel $d$ as large and distinct as possible, the graduations of the scale of tenths of an inch on the outer sleeve $g$, at the left-hand edge of the longitudinal opening $n$, are numbered, as in Figs. 1 and 2, the numeral "1" representing one hundred one-thousandths, "2" two hundred one-thousandths, and so on, and these numbers are not repeated on the inner sleeve. This limits the number of figures for each numeral on the barrel to one or two, representing the tens and units of the respective numerals, with a maximum capacity in the caliper of one inch, or 999 one-thousandths between zeros; and by arranging the two figures of a given numeral on the opposite sides of the corresponding graduation line $q$, as most clearly shown in Figs. 7 and 8, they can be read with the utmost certainty that is practicable with a micrometer screw of a given number of threads per inch.

The individual measurement-indicating numerals are rendered still more distinct in said first species by omitting the figures of alternate indications. See Fig. 7, where 49 would appear in the right-hand end of the index opening $p$ if it were not for this feature, and compare Figs. 2 and 8.

The graduation lines $q$ of such alternate indications may be heavier than those with which figures are directly associated, as shown in Figs. 2, 7 and 8, and their numbers are readily supplied without mental calculation or mistake from those indicated by the adjoining figures.

To provide for reading with like certainty subdivisions of the measurements indicated by the numerals on the barrel $d$, the outer sleeve $g$ is further provided, along the longer edges of the index opening $p$, with graduations subdividing the distance between two of the graduation lines $q$ on the barrel $d$ into ten equal parts, and arranged to aline successively with the successive graduation lines on the barrel; the graduations on the sleeve being distributed along the opposite edges of the opening $p$ and made of different lengths so as to provide for figures as large as may thus be rendered possible indicating the value of each line. Measurements to one ten-thousandth of an inch may thus be read through an ordinary magnifying glass or even with the naked eye. It will be understood that, read in connection with Fig. 2, Fig. 7 represents a measurement of two hundred and fifty one-thousandths and Fig. 8 a measurement of two hundred and fifty thousandths and seven ten-thousandths of an inch.

In the species represented by Fig. 5 the construction above described with reference to Figs. 1–4 and Figs. 6 and 7 is simply embodied in an inside caliper. The spindle end $c$ of the spindle member $A^2$, in this case, projects at the right-hand end of the caliper; and at the other end a contacting tail piece, $s$, is immovably connected with the frame member, $B^2$, of which the outer sleeve forms a part. The construction apart from that hereinbefore specified may be that set forth in United States Patent No. 347844 to John T. Usher, dated August 24, 1886, or of any known or improved description.

In the species represented by Figs. 6 and 9 the caliper may be of the construction set forth with reference to Figs. 1 to 4 inclusive excepting the longitudinal graduation lines and numerals on the barrel $d$, and the index opening or openings, pointers and scales with which the outer sleeve $g$ is provided. The graduation lines, $q^2$, are so arranged in this species as to accommodate the numerals between them, and the outer sleeve is correspondingly provided with a plurality of pointers, $r^2$, which simultaneously aline with the graduation lines when the appropriate numeral is fully exposed in the outer end of the single index opening, $n^2$, as at "125" in Fig. 9. There is a numeral for each one-thousandth of an inch in this arrangement, and each numeral is complete in itself; the longitudinal scales at the respective sides of the opening $n^2$ being, for example, the customary major subdivisions of an inch, and a centimeter divided into millimeters. In the same species (Figs. 6 and 9) provision is made for several subdivisions of the thousandths indicated by the numerals on the barrel $d$ by scales formed along the opposite edges of lateral notches at the outer or reading end of the index opening $n^2$. Two such notches, $t$ and $u$, are shown, with graduations representing respectively fifths, tenths, fifteenths and twentieths of one-thousandth of an inch; these scales reading with reference to any of the longitudinal graduation lines $q^2$ on the barrel $d$.

It will be obvious that the details of the system may be further modified to a large extent. For example, with the barrel $d$ graduated and provided with numerals as in Figs. 6 and 9, the outer sleeve may have an index opening, $p^2$, and pointers, $r^2$, such as are represented in Fig. 10, with scales for intermediate measurements corresponding with those shown in Figs. 7 and 8.

The modification illustrated by Fig. 11 consists in the embodiment of the internal construction above described with reference especially to Figs. 3 and 4, in a caliper that will cost less, in which the measurement-indicating numerals on the barrel $d$ are omitted or confined to a single circle. The figure represents the index opening of such a caliper exposing to view longitudinal graduation lines, $q'$, on the barrel $d$ through a single longitudinal opening, $n'$, in the outer sleeve $g$, and longitudinal scales subdivided for fortieths and thirty-seconds of an inch; the circumferential index line, $m'$, on the barrel $d$, being provided with numerals for the successive longitudinal graduation lines, $q'$, so that the latter may be read for thousandths of an inch in connection with one of the straight edges of the opening, which is designated by a pointer, $r'$.

By making the micrometer screw with twenty threads to the inch instead of forty threads to the inch as hereinbefore described, the depth of the measurement-indicating figures on the barrel may be increased to three sixty-fourths of an inch, approximately, and their clearness thus materially improved. This involves increasing the number of graduation lines on the barrel from twenty-five as hereinbefore described to fifty, but otherwise does not necessarily involve any change in the several constructions hereinbefore described and represented by the drawings.

Other like modifications will suggest themselves to those skilled in the art.

Certain of the combinations of parts hereinafter claimed are common to the specific micrometer calipers hereinbefore described and another species of the same generic invention more fully set forth in a companion specification forming part of an application for patent filed 11 June, 1907, Serial No. 378,337.

Having thus described said improvement, I claim as my invention and desire to patent under this specification:

1. A micrometer caliper composed of two relatively movable members, one of which is a rotatable and longitudinally movable spindle member having as parts thereof a micrometric screw and a barrel concentric with said screw the periphery of which is provided with measurement-indicating means; the other member having an internally screw-threaded portion to interact with said screw and an immovable barrel-protecting outer sleeve closely embracing said barrel and interacting therewith to inclose and protect said screw and said internally screw-threaded portion and provided with measurement-indicating means adapted to register with those on said barrel.

2. A micrometer caliper having, in combination, a rotatable and longitudinally movable spindle member constructed with a micrometric screw and a barrel concentric with said screw the periphery of which is provided with a circumferential index line at midlength of said barrel, and a frame member having an internally screw-threaded portion to interact with said screw and an immovable barrel-protecting outer sleeve embracing said barrel and provided with a longitudinal opening and with a longitudinal scale in juxtaposition thereto, which scale reads in connection with said circumferential index line on the barrel to indicate linear measurements.

3. A micrometer caliper having, in combination, a rotatable and longitudinally movable spindle member constructed with a micrometric screw and a barrel concentric with said screw the periphery of which is provided with a circumferential index line, and a frame member having an internally screw-threaded portion to interact with said screw and an outer sleeve embracing said barrel and provided with a longitudinal opening and with scales differing from each other formed along the respective longitudinal edges of said opening, which read in connection with said index line on the barrel to indicate linear measurements.

4. A micrometer caliper having, in combination, a rotatable and longitudinally movable spindle member constructed with a micrometric screw and a barrel concentric with said screw the periphery of which is provided with a circumferential index line, and a frame member having an internally screw-threaded portion to interact with said screw and an outer sleeve embracing said barrel and provided with a plurality of longitudinal openings and with scales of different standards in juxtaposition to said openings respectively which read in connection with said index line on the barrel to indicate linear measurements of said standards, respectively.

5. A micrometer caliper having, in combination, a rotatable and longitudinally movable spindle member constructed with a micrometric screw and a barrel concentric with said screw the periphery of which is provided with a circumferential index line, and a frame member having an internally screw-threaded and longitudinally adjustable portion to interact with said screw and an outer sleeve embracing said barrel and provided with a longitudinal opening and with a longitudinal scale in juxtaposition thereto, which scale reads in connection with said index line on the barrel to indicate linear measurements, the longitudinal adjustment of said internally screw-threaded portion serving to adjust said spindle member lengthwise with reference to the proper alinement of said index line with the respective graduation lines of said scale, to insure accuracy.

6. A micrometer caliper having, in combination, an internally screw-threaded part, a rotatable and endwise movable spindle, a micrometric screw movable with said spindle and interacting with said internally screw-threaded part, a barrel movable with said spindle and provided on its periphery with numeral-forming figures, adapted to indicate micrometric measurements, arranged in a spiral series corresponding with the screw-thread and in longitudinal rows parallel to each other and to the axis of the barrel, and with longitudinal graduation lines dividing the periphery of the barrel into equal spaces, each of which is the equavilent of a given fractional unit, associated with the longitudinal rows of said figures, respectively, and an outer sleeve immovably connected with the part first named and provided with measurement indicating means adapted to register with said graduation lines successively and to expose to view the appropriate measurement indicating figures on said barrel and sufficient portions of the respective graduation lines associated therewith.

7. A micrometer caliper having, in combination, an internally screw-threaded part, a rotatable and endwise movable spindle, a micrometric screw movable with said spindle and interacting with said internally screw-threaded part, a barrel movable with said spindle and provided on its periphery with figures forming numerals representing successive thousandths for indicating micrometric measurements, arranged in a spiral series corresponding with the screw-thread and in longitudinal rows parallel to each other and to the axis of the barrel, and with longitudinal graduation lines dividing the periphery of the barrel into equal spaces each of which is the equivalent of one such thousandth, associated with the longitudinal rows of said figures, and an outer sleeve immovably connected with the part first named and provided with measurement indicating means adapted to register with said graduation lines successively and to expose to view the appropriate measurement indicating figures on said barrel and sufficient portions of the respective graduation lines associated therewith.

8. A micrometer caliper having, in combination, a rotatable and longitudinally movable spindle member constructed with a micrometric screw and a barrel concentric with said screw the periphery of which is provided with numeral-forming figures arranged in a spiral series and in longitudinal rows, longitudinal graduation lines associated with said rows of figures respectively and a circumferential index line at midlength of the barrel, and a frame member having an internally screw-threaded portion to interact with said screw and an immovable outer sleeve embracing said barrel, said sleeve being apertured to expose to view the appropriate measurement-indicating figures and sufficient lengths of the respective graduation lines associated therewith on the barrel, and provided with a longitudinal scale having numbered graduation lines which read in connection with said index line to supplement the numeral-forming figures exposed to view on the barrel, for the indication of linear measurements in plain figures.

9. A micrometer caliper having, in combination, a rotatable longitudinally movable spindle member constructed with a micrometric screw and a barrel concentric with said screw the periphery of which is provided with a circumferential index line at midlength of the barrel and with a circumferential series of longitudinal graduation lines dividing the periphery of the barrel into equal parts, each of which parts represents a given fractional unit, and numeral-forming figures associated with every other one of said graduation lines in double longitudinal rows and arranged in a spiral series corresponding as to pitch with the screw thread, the figures of each of said rows representing the units and tens of multiples of said fractional unit, and a frame member having an internally screw-threaded portion to interact with said screw and an immovable outer sleeve embracing said barrel, said sleeve being apertured to expose to view the appropriate measurement-indicating figures on the barrel and sufficient portions of the graduation lines associated therewith and of said index line, and provided with a longitudinal scale having numbered graduation lines which read in connection with said index line and the respective numbers of which represent the hundreds of such multiples, to supplement said measurement-indicating figures exposed to view on the barrel and a pointer arranged to register with said graduation lines on the barrel successively.

10. A micrometer caliper having, in combination, a rotatable longitudinally movable spindle member constructed with a micrometric screw and a barrel concentric with said screw the periphery of which is provided with a circumferential index line at midlength of the barrel and with a circumferential series of longitudinal graduation lines dividing the periphery of the barrel into equal parts, each of which parts represents a given fractional unit, and numeral-forming figures associated with every other one of said graduation lines in double longitudinal rows and arranged in a spiral series corresponding as to pitch with the screw thread, the figures of each of said rows representing the units and tens of multiples of said fractional unit, and a frame member having an internally screw-threaded portion to interact with said screw and an immovable outer sleeve embracing said barrel, said sleeve being apertured to expose to view the appropriate measurement-indicating figures on the barrel and sufficient portions of the graduation lines associated therewith and of said index line, and provided with a longitudinal scale having numbered graduation lines which read in connection with said index line and the respective numbers of which represent the hundreds of such multiples, to supplement said measurement-indicating figures exposed to view on the barrel, a pointer arranged to register with said graduation lines on the barrel successively, and a scale which reads in connection with said graduation lines successively to indicate intermediate measurements.

11. A micrometer caliper having, in combination, a rotatable longitudinally movable spindle member constructed with a micrometric screw and a barrel concentric with said screw the periphery of which is provided with a circumferential series of graduation lines dividing the periphery of the barrel into equal parts and extended lengthwise of the barrel, and numeral-forming figures associated with said graduation lines successively in longitudinal rows and arranged in a spiral series corresponding as to pitch with the screw thread, and a frame member having an internally screw-threaded portion to interact with said screw and an outer sleeve embracing said barrel having an opening which exposes to view the appropriate measurement-indicating figures on the barrel and the lines associated therewith, and a transverse series of graduations, arranged in juxtaposition to opposite edges respectively of said opening, said graduations being alternately of different lengths and each of them numbered, to indicate more minute measurements when read in connection with said graduation lines on the barrel, substantially as hereinbefore specified.

FERNANDO O. JAQUES, Jr.

Witnesses:
LOUIS L. ANGELL,
AMY B. SUTCLIFFE.